United States Patent Office 3,367,965
Patented Feb. 6, 1968

3,367,965
Δ³,⁶-A-NORANDROSTADIENES AND
INTERMEDIATES
Seymour D. Levine, North Brunswick, N.J., assignor, by mesne assignments, to E. R. Squibb & Sons, Inc., New York, N.Y., a corporation of Delaware
No Drawing. Filed Oct. 1, 1965, Ser. No. 492,286
16 Claims. (Cl. 260—488)

This invention relates to new steroidal compounds and, more particularly, to new steroids of the A-norandrostane series, new intermediates useful in the preparation of the same, and processes for preparing the same.

The new final products of this invention are of the Formula I:

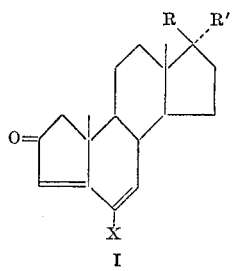

I wherein X is chloro or bromo, R is hydroxy or acyloxy; and R' is vinyl, ethynyl, halo substituted vinyl, trifluoromethyl substituted vinyl, halo substituted ethynyl and trifluoromethyl substituted ethynyl. Among the suitable acyloxys may be mentioned the acyloxy radical of a hydrocarbon carboxylic acid of less than twelve carbon atoms, as exemplified by the lower alkanoic acids (e.g., acetic, propionic, butyric, hexanoic and enanthic acid), the lower alkenoic acids, the cycloalkane carboxylic acids, the cycloalkene carboxylic acids, the monocyclic aromatic carboxylic acids (e.g., benzoic acid), and the monocyclic aryl(lower alkanoic) acids (e.g., phenacetic and β-phenylpropionic acid). Among the suitable halogen substituted vinyls may be mentioned perhalovinyls, such as trifluorovinyl, trichlorovinyl, 1,2-difluoro-2-chlorovinyl and 1,2-difluoro-2-bromovinyl; the dihalovinyls, such as 1,2-difluorovinyl, 2,2-difluorovinyl, 1-chloro-2-fluorovinyl, 1-bromo-2-fluorovinyl, and 1,2-dichlorovinyl; and the monohalovinyls, such as 1-fluorovinyl, 2-fluorovinyl, 1-chlorovinyl, 2-chlorovinyl, and 1-bromovinyl. Among the suitable halogen substituted ethynyls may be mentioned fluoroethynyl, chloroethynyl and bromoethynyl.

The final products of this invention are prepared by interacting a compound of the Formula II:

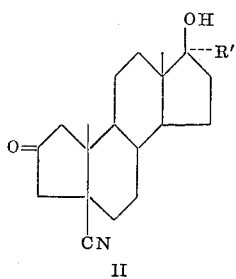

II wherein R' is as hereinbefore defined, with a base such as lithium acetylide·ethylenediamine complex, sodium hydride in dimethylformamide or sodium hydroxide in ethyleneglycol. The compounds of Formula II can be prepared as described in U.S. patent application, Ser. No. 440,311, filed Mar. 16, 1965, now Patent No. 3,330,851. The process results in the preparation of now intermediates of this invention of the Formula III:

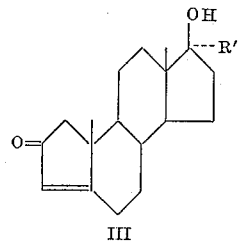

III wherein R' is as hereinbefore defined. To prepare the 17β-esters, compounds of Formula III are acylated in the usual manner by treatment with an acyl chloride or acid anhydride of the desired acid in the presence of perchloric acid, preferably one of the acids mentioned hereinbefore.

The compounds of Formula III (or a 17-ester thereof) are then treated with 2,3-dichloro-5,6-dicyanobenzoquinone and hydrogen chloride, or 2,3-dichloro-5,6-dicyanobenzoquinone and hydrogen bromide, to yield new intermediates of the Formula IV:

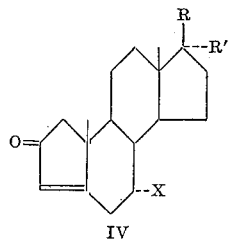

IV wherein R and R' are as hereinbefore defined, and X is bromo or preferably chloro. Compounds of Formula IV may be esterified, if a free 17β-hydroxy compound is initially formed, in the usual manner to yield the 17β-ester derivative.

The compounds of Formula IV are then heated with a tertiary base, such as collidine, to yield compounds of the Formula V:

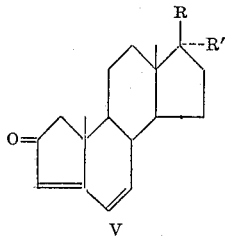

V wherein R and R' are as hereinbefore defined.

Compounds of the Formula V are then treated with a peracid, such as m-chloroperbenzoic acid, to yield compounds of the Formula VI:

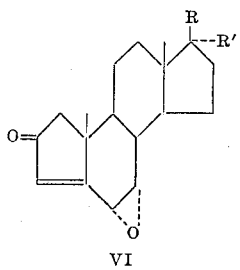

VI wherein R and R' are as hereinabove defined, which on treatment with an equivalent amount of a hydrohalic acid (i.e., hydrochloric and hydrobromic acid) at room temperature, yield compounds of the Formula VII:

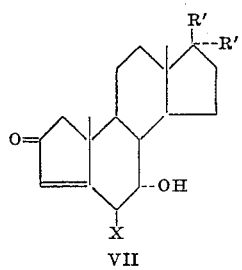

VII wherein R, R' and X are as hereinbefore defined, which upon heating in acid solution to a temperature of about 40° C. to about 50° C., yield the final products (Compounds I) of this invention.

Compounds of Formula VI can also be converted to compounds of Formula I in one step by treating with an excess of a hydrohalic acid at an elevated temperature.

If a compound wherein R' is ethynyl, halo substituted ethynyl or trifluoromethyl substituted ethynyl is used as the initial reactant and a vinyl derivative is desired, it may be formed by an alternative method by reducing the ethynyl compound of Formula III by treatment with hydrogen in the presence of a palladium catalyst.

The compounds of the instant invention having the Formulae I, III, IV and V are physiologically active steroids which possess anti-androgenic activity, i.e., they inhibit the action of androgens, and they may be used in the treatment of such conditions as hyperandrogenic acne. The compounds may be formulated for such administration, the concentration and/or dosage being based on the activity of the particular compound and the requirements of the patient.

The following examples illustrate the invention (all temperatures being in centigrade):

*Example 1.—17α-ethynyl-Δ³-A-norandrostene-17β-ol-2-one*

A mixture of 200 mg. of 5β-cyano-17α-ethynyl-A-norandrostane-17β-ol-2-one and 270 mg. of lithium acetylide·ethylene-diamine complex in 10 ml. of benzene and 10 ml. of tetrahydrofuran is warmed at 50° for 16 hr. under helium with stirring. The reaction mixture is treated with 10 ml. of water and refluxed for 1 hr., then diluted with additional water and extracted with chloroform. The chloroform extracts are washed with 8% salt solution, dried over sodium sulfate and evaporated to dryness. Plate chromatography of the residue using neutral alumina (Act. V) as the adsorbent and chloroform as the developing solvent gives a major band which is detectable by ultraviolet. Elution with ethyl acetate gives a residue which is crystallized from ethyl acetate-isopropyl ether to afford about 57 mg. of 17α-ethynyl-Δ³-A-norandrostene-17β-ol-2-one, M.P. about 196–198°. The analytical sample is prepared by recrystallization from ethyl acetate-isopropyl ether, M.P. about 201.5–202.5°; $[\alpha]_D^{21}$ −124° (EtOH); $\lambda^{EtOH}$ 233 m$\mu$ (13,900);

$\tau_{CDCl_3}^{TMS}$ 9.09 (s., 18-Me), 8.82 (s., 19-Me), 7.44 (s., 17α-C≡CH) and 4.27 (s., 3-H)

*Analysis.*—Calcd. for $C_{20}H_{26}O_2$ (298.41): C, 80.49; H, 8.78. Found: C, 80.50; H, 8.88.

The dehydrocyanation can also be carried out by room temperature treatment of 5β-cyano-17α-ethynyl-A-norandrostane-17β-ol-2-one with sodium hydride in dimethylformamide; or with sodium hydroxide in 17% aqueous ethylene glycol solution at reflux temperature.

*Example 2.—17α-ethynyl-Δ³-A-norandrostene-2-one-17β-ol acetate*

A solution of 0.0033 ml. of perchloric acid in 0.3 ml. of acetic anhydride is added to 500 mg. of 17α-ethynyl-Δ³-A-norandrostene-2-one-17β-ol in 10 ml. of acetic anhydride. The reaction mixture is stirred at room temperature for 30 minutes and then poured into ice-water and extracted with chloroform. The chloroform extracts are washed with a saturated sodium bicarbonate solution, 8% salt solution, dried over sodium sulfate and evaporated to dryness to give 17α-ethynyl-Δ³-A-norandrostane-2-one-17β-ol acetate.

Similarly, by substituting any other acyl chloride or acid anhydride for the acetic anhydride in the procedure of Example 3, the corresponding 17-ester is formed. Thus, propionic anhydride and benzoyl chloride yield the propionate and benzoate, respectively.

*Example 3.—17α-trifluoropropynyl-Δ³-norandrostene-2-one-17β-ol*

Following the procedure of Example 1, but substituting an equivalent amount of 5β-cyano-17α-trifluoropropynyl-A-norandrostane-17-β-ol-2-one for the steroid reactant, 17α-trifluoropropynyl-Δ³-A-norandrostene-2-one-17β-ol is formed.

Similarly, by substituting an equivalent amount of the indicated 17α-R'-5β-cyano-A-norandrostane-2-one-17β-ol for the steroid reactant in the procedure of Example 1, the designated 17α - R' - Δ³-A-norandrostene-2-one-17β-ol is formed:

| Example | Reactant (R' is) | Product (R' is) |
|---|---|---|
| 4 | Chloroethynyl | Chloroethynyl |
| 5 | Vinyl | Vinyl |
| 6 | β-Chlorovinyl | β-Chlorovinyl |
| 7 | α,β-Dichlorovinyl | α,β-Dichlorovinyl |
| 8 | α,β-Difluorovinyl | α,β-Difluorovinyl |

*Example 9.—7α-chloro-17α-ethynyl-Δ³-A-norandrostene-17β-ol-2-one*

A mixture of 490 mg. of 17α-ethynyl-Δ³-A-norandrostene-17β-ol-2-one and 750 mg. of 2,3-dichloro-5,6-dicyanobenzoquinone in 25 ml. of dioxane is treated with hydrogen chloride (g) for 10 minutes, stoppered and left at room temperature for 67 hr. The hydroquinone is removed by filtration, and the filtrate evaporated to dryness. Plate chromatography of the residue using neutral alumina (Act. V) as the adsorbent and chloroform as the developing solvent gives three bands detectable by ultraviolet. The least polar band is eluted with ethyl acetate and gives a residue which is crystallized from ethyl acetate-isopropyl ether to afford about 140 mg. of 17α-chloro-17α-ethynyl-Δ³-A-norandrostene-17β-ol-2-one, M.P. about 166–167° (eff.). The analytical sample is prepared by recrystallization from ethyl acetate-isopropyl ether, M.P. about 172–173° (eff.) $\lambda^{KBr}$ 2.97, 3.07, 5.97 and 6.13$\mu$; $\lambda^{EtOH}$ 233 m$\mu$ (14,500);

$\tau_{CDCl_3}^{TMS}$ 9.08 (s., 18-Me), 8.80 (s., 19-Me), 7.41 (s., 17α-C≡CH), 5.62 (m., $W_H$∼6 cps., 7β-H), and 4.10 (s. 3-H)

*Analysis.*—Calc'd. for $C_{20}H_{25}O_2Cl$ (332.86): C, 72.19; H, 7.57. Found: C, 72.16; H, 7.54.

*Example 10.—7α-chloro-17α-ethynyl-Δ³-A-norandrostene-2-one-17β-ol acetate*

A solution of 0.0033 ml. of perchloric acid in 0.3 ml. of acetic anhydride is added to 500 mg. of 7α-chloro-17α-ethynyl-Δ³-A-norandrostene-2-one-17β-ol in 10 ml. of acetic anhydride. The reaction mixture is stirred at room temperature for 30 minutes and then poured into ice-water and extracted with chloroform. The chloroform extracts are washed with a saturated sodium bicarbonate solution, 8% salt solution, dried over sodium sulfate and evaporated to dryness to give a 7α-chloro-17α-ethynyl-Δ³-A-norandrostene-2-one-17β-ol acetate.

Similarly, by substituting any other acyl chloride or acid anhydride for the acetic anhydride in the procedure of Example 10, the corresponding 17-ester is formed. Thus, propionic anhydride and benzoyl chloride yield the propionate and benzoate, respectively.

*Example 11.—7α-chloro-17α-trifluoropropynyl-Δ³-A-norandrostene-2-one-17β-ol*

Following the procedure of Example 9, but substituting an equivalent amount of 17α-trifluoropropynyl-Δ³-A-norandrostene-17β-ol-2-one for the steroid reactant, 7α-chloro - 17α-trifluoropropynyl-Δ³-A-norandrostene-2-one-17β-ol is formed.

Similarly, by substituting an equivalent amount of the indicated 17α-R′-Δ³-A-norandrostene-2-one-17β-ol for the steroid reactant in the procedure of Example 9, the designated 7α-chloro-17α-R′-Δ³-A-norandrostene-2-one-17β-ol is formed:

| Example | Reactant (R′ is) | Product (R′ is) |
|---|---|---|
| 12 | Chloroethynyl | Chloroethynyl. |
| 13 | Vinyl | Vinyl. |
| 14 | β-Chlorovinyl | β-Chlorovinyl. |
| 15 | α,β-Dichlorovinyl | α,β-Dichlorovinyl. |
| 16 | α,β-Difluorovinyl | α,β-Difluorovinyl. |

*Example 17.—17α-ethynyl-Δ³,⁶-A-norandrostadiene-17β-ol-2-one*

A mixture of 300 mg. of 7α-chloro-17α-ethynyl-Δ³-A-norandrostene-17β-ol-2-one and 10 ml. of collidine is refluxed for 1 hr., cooled and diluted with chloroform. The chloroform solution is washed with 2 N hydrochloric acid, saturated sodium bicarbonate solution, 8% salt solution, dried over sodium sulfate and evaporated to dryness. Plate chromatography of the residue using neutral alumina (Act. V) as the adsorbent and chloroform as the developing solvent gives a major band detectable by ultraviolet. Elution with ethyl acetate gives a residue which is crystallized from acetone-hexane to give 17α-ethynyl-Δ³,⁶-A-norandrostadiene-17β-ol-2-one, M.P. about 206–208°. The analytical sample is prepared by recrystallization from chloroform-isopropyl ether, M.P. about 206–208°, $[\alpha]_D^{25}$ −141° (EtOH); $\lambda^{KBr}$ 2.97, 3.05, 5.88, 6.00 and 6.33μ; $\lambda^{EtOH}$ 278 mμ (22,600);

$\tau^{TMS}_{CDCl_3}$ 9.03 (s., 18-Me), 8.88 (s., 19-Me), 7.44 (s., 17α-C≡CH), 4.27 (s., 3-H), 3.87 (d, d, ∼2 cps., 10.5 cps., 6-H), 3.49 (d, d, ∼1 cps., 10.5 cps., 7-H)

*Analysis.*—Calcd. for $C_{20}H_{24}O_2$ (296.39): C, 81.04; H, 8.16. Found: C, 81.04; H, 8.14.

*Example 18.—17α-ethynyl-Δ³,⁶-A-norandrostadiene-2-one-17β-ol acetate*

A solution of 0.0033 ml. of perchloric acid in 0.3 ml. of acetic anhydride is added to 500 mg. of 17α-ethynyl-Δ³,⁶-A-norandrostadiene-2-one-17β-ol in 10 ml. of acetic anhydride. The reaction mixture is stirred at room temperature for 30 minutes and then poured into ice-water and extracted with chloroform. The chloroform extracts are washed with a saturated sodium bicarbonate solution, 8% salt solution, dried over sodium sulfate and evaporated to dryness to give 17α-ethynyl-Δ³,⁶-A-norandrostadiene-2-one-17β-ol acetate.

Similarly, by substituting any other acyl chloride or acid anhydride for the acetic anhydride in the procedure of Example 18, the corresponding 17-ester is formed. Thus, propionic anhydride and benzoyl chloride yield the propionate and benzoate, respectively.

*Example 19.—17α-trifluoropropynyl-Δ³,⁶-A-norandrostadiene-2-one-17β-ol*

Following the procedure of Example 17, but substituting an equivalent amount of 7α-chloro-17α-trifluoropropynyl-Δ³-A-norandrostene-17β-ol-2-one for the steroid reactant, 17α - trifluoropropynyl-Δ³,⁶-A-norandrostadiene-2-one-17β-ol is formed.

Similarly, by substituting an equivalent amount of the indicated 7α - choloro-17α-R′-Δ³-A-norandrostene-2-one-17β-ol for the steroid reactant in the procedure of Example 17, the designated 17α-R′-Δ³,⁶-A-norandrostadiene-2-one-17β-ol is formed:

| Example | Reactant (R′ is) | Product (R′ is) |
|---|---|---|
| 20 | Chloroethynyl | Chloroethynyl. |
| 21 | Vinyl | Vinyl. |
| 22 | β-Chlorovinyl | β-Chlorovinyl. |
| 23 | α,β-Dichlorovinyl | α,β-Dichlorovinyl. |
| 24 | α,β-Difluorovinyl | α,β-Difluorovinyl. |

*Example 25.—17α-vinyl-Δ³-A-norandrostene-17β-ol-2-one*

A mixture of 300 mg. of 17α-ethynyl-Δ³-A-norandrostene-17β-ol-2-one and 50 mg. of 5% palladium on carbon catalyst in 15 ml. of dioxane is hydrogenated until one mole equivalent of hydrogen is taken up. The catalyst is removed by filtration and the filtrate evaporated to dryness to give 17α-vinyl-Δ³-A-norandrostene-17β-ol-2-one.

*Example 26.—6α,7α-oxido-17α-ethynyl-Δ³-A-norandrostene-17β-ol-2-one*

A mixture of 100 mg. of 17α-ethynyl-Δ³,⁶-A-norandrostadiene-17β-ol-2-one and 210 mg. of m-chloroperbenzoic acid in 15 ml. of methylene chloride is left at room temperature for 3 days. The organic layer is washed with a saturated sodium bicarbonate solution, 5% sodium sulfite solution, and 8% salt solution, dried over sodium sulfate and evaporated to dryness to give 6α,7α-oxido-17α-ethynyl-Δ³-A-norandrostene-17β-ol-2-one.

*Example 27.—6α,7α-oxido-17α-trifluoropropynyl-Δ³-A-norandrostene-2-one-17β-ol*

Following the procedure of Example 26, but substituting an equivalent amount of 17α-trifluoropropynyl-Δ³,⁶-A-norandrostadiene-17β-ol-2-one for the steroid reactant, 6α,7α-oxido - 17α - trifluoropropynyl-Δ³-A-norandrostene-2-one-17β-ol is formed.

Similarly, by substituting an equivalent amount of the indicated 17α-R′-Δ³,⁶-A-norandrostadiene - 2 - one-17β-ol for the steroid reactant in the procedure of Example 26, the designated 6α,7α-oxido-17α-R′-Δ³-A-norandrostene-2-one-17β-ol is formed:

| Example | Reactant (R′ is) | Product (R′ is) |
|---|---|---|
| 28 | Chloroethynyl | Chloroethynyl. |
| 29 | Vinyl | Vinyl. |
| 30 | β-Chlorovinyl | β-Chlorovinyl. |
| 31 | α,β-Dichlorovinyl | α,β-Dichlorovinyl. |
| 32 | α,β-Difluorovinyl | α,β-Difluorovinyl. |

*Example 33.—6β-chloro-17α-ethynyl-Δ³-A-norandrostene-7α,17β-diol-2-one*

A solution of 75 mg. of 6α,7α-oxido-17α-ethynyl-Δ³-A-norandrostene-17β-ol-2-one in 6 ml. of chloroform is treated with a slight excess of hydrogen chloride in chloroform and left at room temperature for 2.5 hr. The reaction mixture is washed with a saturated sodium bicarbonate solution, 8% salt solution, dried over sodium sulfate and evaporated to dryness to give 6β-chloro-17α-ethynyl-Δ³-A-norandrostene-7α,17β-diol-2-one.

If the procedure of Example 33 is carried out at 45° C., 6-chloro - 17α - ethynyl-Δ³,⁶-A-norandrostadiene-17β-ol-2-one is obtained as the product.

*Example 34.—6β-chloro-17α-trifluoropropynyl-Δ³-A-norandrostene-2-one-7α,17β-diol*

Following the procedure of Example 33, but substituting an equivalent amount of 6α,7α-oxido-17α-trifluoropropynyl-Δ³-A-norandrostene-17β-ol-2-one for the steroid reactant, 6β-chloro-17α-trifluoropropynyl-Δ³-A-norandrostene-2-one-7α,17β-diol is formed.

Similarly, by substituting an equivalent amount of the indicated 6α,7α-oxido - 17α - R' - Δ³ - A-norandrostene-2-one-17β-ol for the steroid reactant in the procedure of Example 33, the designated 6β-chloro-17α-R'-Δ³-A-norandrostene-2-one-7α,17β-diol is formed:

| Example | Reactant (R' is) | Product (R' is) |
| --- | --- | --- |
| 35 | Chloroethynyl | Chloroethynyl. |
| 36 | Vinyl | Vinyl. |
| 37 | β-Chlorovinyl | β-Chlorovinyl. |
| 38 | α,β-Dichlorovinyl | α,β-Dichlorovinyl. |
| 39 | α,β-Difluorovinyl | α,β-Difluorovinyl. |

*Example 40.—6-chloro-17α-ethynyl-Δ³,⁶-A-norandrostadiene-17β-ol-2-one*

Hydrogen chloride is passed into a solution of 300 mg. of 6α,7α-oxido - 17α - ethynyl-Δ³-A-norandrostene-17β-ol-2-one in 30 ml. of chloroform for 3 minutes. The reaction mixture is left at room temperature for 2 hrs. and then at 45° for 1 day. The reaction mixture is washed with a saturated sodium bicarbonate solution, 8% salt solution, dried over sodium sulfate and evaporated to dryness to give 6-chloro-17α-ethynyl-Δ³,⁶-A-norandrostadiene-17β-ol-2-one.

*Example 41.—6-chloro-17α-ethynyl-Δ³,⁶-A-norandrostadiene-2-one-17β-ol acetate*

A solution of 0.0033 ml. of perchloric acid in 0.3 ml. of acetic anhydride is added to 500 mg. of 6-chloro-17α - ethynyl-Δ³,⁶-A-norandrostadiene-2-one-17β-ol in 10 ml. of acetic anhydride. The reaction mixture is stirred at room temperature for 30 minutes and then poured into ice-water and extracted with chloroform. The chloroform extracts are washed with a saturated sodium bicarbonate solution, 8% salt solution, dried over sodium sulfate and evaporated to dryness to give 6-chloro-17α-ethynyl-Δ³,⁶-A-norandrostadiene-2-one-17-ol acetate.

Similarly, by substituting any other acyl chloride or acid anhydride for the acetic anhydride in the procedure of Example 41, the corresponding 17-ester is formed. Thus, propionic anhydride and benzoyl chloride yield the propionate and benzoate, respectively.

*Example 42.—6-chloro-17α-trifluoropropynyl-Δ³,⁶-A-norandrostadiene-2-one-17β-ol*

Following the procedure of Example 40, but substituting an equivalent amount of 6α,7α-oxido-17α-trifluoropropynyl-Δ³-A-androstadiene-17β-ol-2-one for the steroid reactant, 6 - chloro - 17α-trifluoropropynyl-Δ³,⁶-A-norandrostadiene-2-one-17β-ol is formed.

Similarly, by substituting an equivalent amount of the indicated 6α,7α - oxido-17α-R'-Δ³-A-norandrostene-2-one-17β-ol for the steroid reactant in the procedure of Example 40, the designated 6-chloro-17α-R'-Δ³,⁶-A-norandrostadiene-2-one-17β-ol is formed:

| Example | Reactant (R' is) | Product (R' is) |
| --- | --- | --- |
| 43 | Chloroethynyl | Chloroethynyl. |
| 44 | Vinyl | Vinyl. |
| 45 | β-Chlorovinyl | β-Chlorovinyl. |
| 46 | α,β-Dichlorovinyl | α,β-Dichlorovinyl. |
| 47 | α,β-Difluorovinyl | α,β-Difluorovinyl. |

The invention may be variously otherwise embodied within the scope of the appended claims.

What is claimed is:
1. A compound of the formula

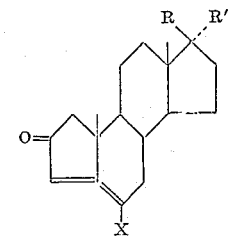

wherein X is selected from the group consisting of chloro and bromo, R is selected from the group consisting of hydroxy and the acyloxy radical of a hydrocarbon carboxylic acid of less than twelve carbon atoms, and R' is selected from the group consisting of vinyl, ethynyl, halo substituted vinyl, trifluoromethyl substituted vinyl, halo substituted ethynyl and trifluoromethyl substituted ethynyl.

2. 6-chloro-17α-ethynyl-Δ³,⁶-A-norandrostadiene-2-one-17β-ol acetate.
3. 6-chloro-17α-ethynyl-Δ³,⁶-A-norandrostadiene-2-one-17β-ol acetate.
4. 6-chloro-17α-trifluoropropynyl-Δ³,⁶-A-norandrostadiene-2-one-17β-ol.
5. A compound of the formula

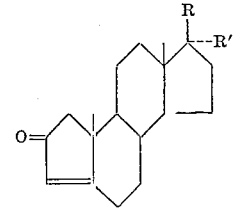

wherein R is selected from the group consisting of hydroxy and the acyloxy radical of a hydrocarbon carboxylic acid of less than twelve carbon atoms, and R' is selected from the group consisting of vinyl, ethynyl, halo substituted vinyl, trifluoromethyl substituted vinyl, halo substituted ethynyl and trifluoromethyl substituted ethynyl.

6. 17α-ethynyl-Δ³-A-norandrostene-2-one-17β-ol.
7. 17α-trifluoropropynyl-Δ³-A-norandrostene-2-one-17β-ol.
8. 17α-vinyl-Δ³-A-norandrostene-2-one-17β-ol.
9. A compound of the formula

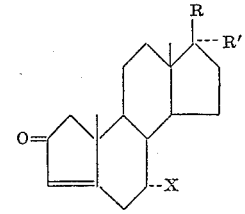

wherein R is selected from the group consisting of hydroxy and the acyloxy radical of a hydrocarbon carboxylic acid of less than twelve carbon atoms, R' is selected from the group consisting of vinyl, ethynyl, halo substituted vinyl, trifluoromethyl substituted vinyl, halo substituted ethynyl and trifluoromethyl substituted ethynyl and X is selected from the group consisting of bromo and chloro.

10. 7α-chloro-17α-ethynyl-Δ³-A-norandrostene-2-one-17β-ol.
11. 7α-chloro-17α-trifluoropropynyl-Δ³-A-norandrostene-2-one-17β-ol.

12. A compound of the formula

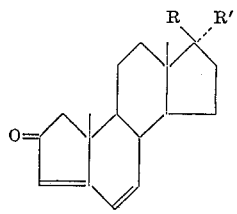

wherein R is selected from the group consisting of hydroxy and the acyloxy radical of a hydrocarbon carboxylic acid of less than twelve carbon atoms, and R' is selected from the group consisting of vinyl, ethynyl, halo substituted vinyl, trifluoromethyl substituted vinyl, halo substituted ethynyl and trifluoromethyl substituted ethynyl.

13. 17α-ethynyl-$\Delta^{3,6}$-A-norandrostadiene-2-one-17β-ol.

14. 17α-ethynyl-$\Delta^{3,6}$-A-norandrostadiene-2-one-17β-ol acetate.

15. 17α-trifluoropropynyl-$\Delta^{3,6}$-A-norandrostadiene-2-one-17β-ol.

16. A compound of the formula

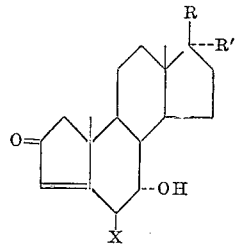

wherein R is selected from the group consisting of hydroxy and the acyloxy radical of a hydrocarbon carboxylic acid of less than twelve carbon atoms, R' is selected from the group consisting of vinyl, ethynyl, halo substituted vinyl, trifluoromethyl substituted vinyl, halo substituted ethynyl and trifluoromethyl substituted ethynyl and X is selected from the group consisting of bromo and chloro.

References Cited

UNITED STATES PATENTS 3,210,460  10/1965  Weisenborn _____ 260—488

LORRAINE A. WEINBERGER, *Primary Examiner.*

V. GARNER, *Assistant Examiner.*

UNITED STATES PATENT OFFICE
CERTIFICATE OF CORRECTION

Patent No. 3,367,965                              February 6, 1968

Seymour D. Levine

It is hereby certified that error appears in the above numbered patent requiring correction and that the said Letters Patent should read as corrected below.

Column 2, line 1, for "now" read -- new --; column 3, formula VII should appear as shown below instead of as in the patent:

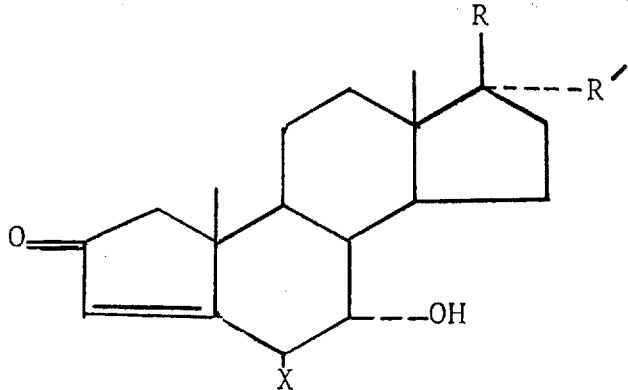

column 4, line 52, for "17α-chloro" read -- 7α-chloro --; column 7, line 55, for "A-androstadiene" read -- A-norandrostene --; column 8, lines 4 to 11, the formula should appear as shown below instead of as in the patent:

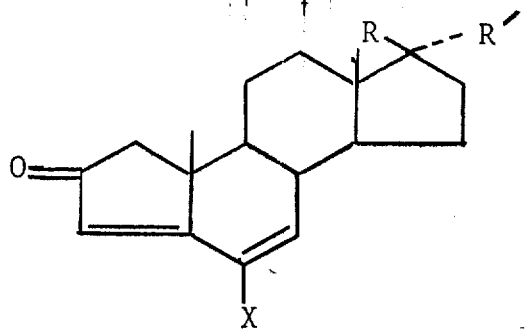

Signed and this 1st day of April 1969.

(SEAL)
Attest:

EDWARD M. FLETCHER, JR.                      EDWARD J. BRENNER
Attesting Officer                              Commissioner of Patents